US012491126B2

(12) United States Patent
Stanley

(10) Patent No.: US 12,491,126 B2
(45) Date of Patent: Dec. 9, 2025

(54) MOBILE HAND PHYSIATRY

(71) Applicant: Charles O. Stanley, Buena Vista, CO (US)

(72) Inventor: Charles O. Stanley, Buena Vista, CO (US)

(*) Notice: Subject to any disclaimer, the term of this patent is extended or adjusted under 35 U.S.C. 154(b) by 518 days.

(21) Appl. No.: 18/297,149

(22) Filed: Apr. 7, 2023

(65) Prior Publication Data

US 2023/0320918 A1 Oct. 12, 2023

Related U.S. Application Data

(60) Provisional application No. 63/328,984, filed on Apr. 8, 2022.

(51) Int. Cl.
*A61H 1/02* (2006.01)

(52) U.S. Cl.
CPC .................................. *A61H 1/0285* (2013.01)

(58) Field of Classification Search
CPC .. A61H 1/0285; A63B 21/4035; A63B 23/14; A63B 23/16; A63B 71/0009; A63B 2214/00
See application file for complete search history.

(56) References Cited

U.S. PATENT DOCUMENTS

| | | | | |
|---|---|---|---|---|
| 1,848,598 A | | 3/1932 | Barnes | |
| 2,835,986 A | | 5/1958 | Roeder | |
| 2,911,740 A | | 11/1959 | Miller | |
| D187,218 S | * | 2/1960 | McHugh | 434/258 |
| 2,972,820 A | | 2/1961 | Cano | |
| 3,427,731 A | | 2/1969 | Debolt | |
| 4,337,050 A | | 6/1982 | Engalitcheff | |
| 4,382,795 A | | 5/1983 | Collins et al. | |
| 4,457,722 A | | 7/1984 | Housand | |
| 4,822,027 A | * | 4/1989 | Kascak | A63B 21/0552 482/901 |
| 5,078,388 A | | 1/1992 | Dempsey | |
| D327,328 S | * | 6/1992 | Luce | D24/188 |
| 5,435,728 A | * | 7/1995 | Fula | A63H 33/12 434/258 |
| 5,538,432 A | * | 7/1996 | Dondero | G09B 19/00 434/258 |

(Continued)

FOREIGN PATENT DOCUMENTS

| | | | | | |
|---|---|---|---|---|---|
| CN | 205910868 U | * | 1/2017 | | |
| CN | 110038271 A | * | 7/2019 | A63H 33/00 | |

(Continued)

*Primary Examiner* — Gary D Urbiel Goldner
(74) *Attorney, Agent, or Firm* — MP Patents, LLC

(57) ABSTRACT

A hand therapy system includes a substrate having a front opening, a rear opening, and left side, right side, top, and bottom surfaces. Provided to the surfaces are a station configured to exercise an ability to lock and unlock a door, a station configured to exercise opening and/or closing of a hand, at least one station configured to exercise fingertip thumb-finger oppositional gripping and rotating as well as size discernment, at least one station configured to exercise palmar gripping, supination, and pronation, and at least one station configured to exercise fingertip thumb-finger oppositional gripping, elbow extension and flexion, and size discernment.

17 Claims, 8 Drawing Sheets

(56) References Cited

U.S. PATENT DOCUMENTS

| | | | | |
|---|---|---|---|---|
| 5,755,576 | A * | 5/1998 | Dunn | A61B 5/162 434/258 |
| 5,957,813 | A | 9/1999 | Macdonald | |
| 6,142,786 | A | 11/2000 | Culberson et al. | |
| 6,746,373 | B1 | 6/2004 | Bohmer | |
| 2011/0245041 | A1 * | 10/2011 | Mayes | A63B 21/00069 482/44 |
| 2011/0261534 | A1 * | 10/2011 | Yang | G11B 33/08 411/347 |
| 2013/0143718 | A1 * | 6/2013 | Pani | A63B 21/4035 482/8 |
| 2016/0325197 | A1 * | 11/2016 | Smith | A47B 23/04 |
| 2017/0065845 | A1 * | 3/2017 | Pinkus | A63B 21/4035 |
| 2018/0221698 | A1 * | 8/2018 | Heathfield | A63B 21/4047 |
| 2025/0025747 | A1 * | 1/2025 | Mugertza Estevan | A63B 21/0428 |

FOREIGN PATENT DOCUMENTS

| | | | | |
|---|---|---|---|---|
| CN | 110115847 | A * | 8/2019 | A63H 33/006 |
| CN | 110840708 | A * | 2/2020 | A61H 1/0288 |
| CN | 113730229 | A * | 12/2021 | A61H 33/06 |
| DE | 202022001201 | U1 * | 6/2022 | A63B 23/1209 |
| ES | 1284919 | U * | 1/2022 | A63B 71/0622 |

* cited by examiner

MOBILE HAND PHYSIATRY

CROSS REFERENCE TO RELATED APPLICATIONS

This application claims the priority benefit of U.S. Provisional application No. U.S. 63/328,984 filed 2022 Apr. 8, pending which is incorporated herein by reference in its entirety.

TECHNICAL FIELD

The disclosure relates to physical medicine and rehabilitation. In particular, the disclosure relates to physical medicine and rehabilitation of the limbs.

SUMMARY

The disclosure describes hand therapy systems. A first hand therapy system includes a substrate having a front opening, a rear opening and left side, right side, top and bottom surfaces. Provided to one of the surfaces are a rectangular depression with at least one row of differently sized openings provided thereto. Also provided are a pair of slots, a first hole aligned with a first slot of the pair and a second hole aligned with the first hole and a second slot of the pair and several differently-sized mounting holes.

A second hand therapy system includes a substrate having a front opening, a rear opening and left side, right side, top and bottom surfaces. Provided to the surfaces are a station configured to exercise ability lock and unlock a door, a station configured to exercise opening and/or closing of a hand, at least one station configured to exercise fingertip thumb-finger oppositional gripping and rotating as well as size discernment, at least one station configured to exercise palmar gripping and hand abduction and adduction and at least one station configured to exercise fingertip thumb-finger oppositional gripping and elbow extension and flexion as well as size discernment.

A third hand therapy system includes a substrate having a front opening, a rear opening and left side, right side, top and bottom surfaces. Provided to the surfaces are a doorknob with a keyhole, a row of graduated openings, an elongated handle with a longitudinal axis elevated above the top surface by one or more supports and a pair of slots and extending away from the elongated handle.

BRIEF DESCRIPTION OF THE FIGURES

The summary above, as well as the following detailed description of illustrative embodiments, is better understood when read in conjunction with the appended drawings. For the purpose of illustrating the disclosure, example constructions are shown in the drawings. However, the disclosure is not limited to specific methods and instrumentalities disclosed herein. Moreover, those having ordinary skill in the art will understand that the drawings are not to scale. Wherever possible, like elements have been indicated by identical numbers.

Embodiments of the disclosure will now be described, by way of example only, with reference to the following diagrams wherein.

DETAILED DESCRIPTION

The following detailed description illustrates embodiments of the disclosure and manners by which they can be implemented. Although the best mode of carrying out disclosed systems, apparatuses and methods has been described, those of ordinary skill in the art would recognize that other embodiments for carrying out or practicing disclosed systems, apparatuses and methods are also possible.

It should be noted that the terms "first", "second", and the like, herein do not denote any order, quantity, or importance, but rather are used to distinguish one element from another. Further, the terms "a" and "an" herein do not denote a limitation of quantity, but rather denote the presence of at least one of the referenced item.

Embodiments of the disclosure provide an occupational and/or physical therapy system suitable for rehabilitative use with a patient's hands.

Embodiments of the disclosure substantially eliminate, or at least partially address, problems in the prior art, enabling a variety of exercise and/or therapies in a portable package.

Additional aspects, advantages, features and objects of the disclosure will be made apparent from the drawings and the detailed description of the illustrative embodiments construed in conjunction with the appended claims that follow.

It will be appreciated that described features are susceptible to being combined in various combinations without departing from the scope of the disclosure as defined by the appended claims.

Figure 1:
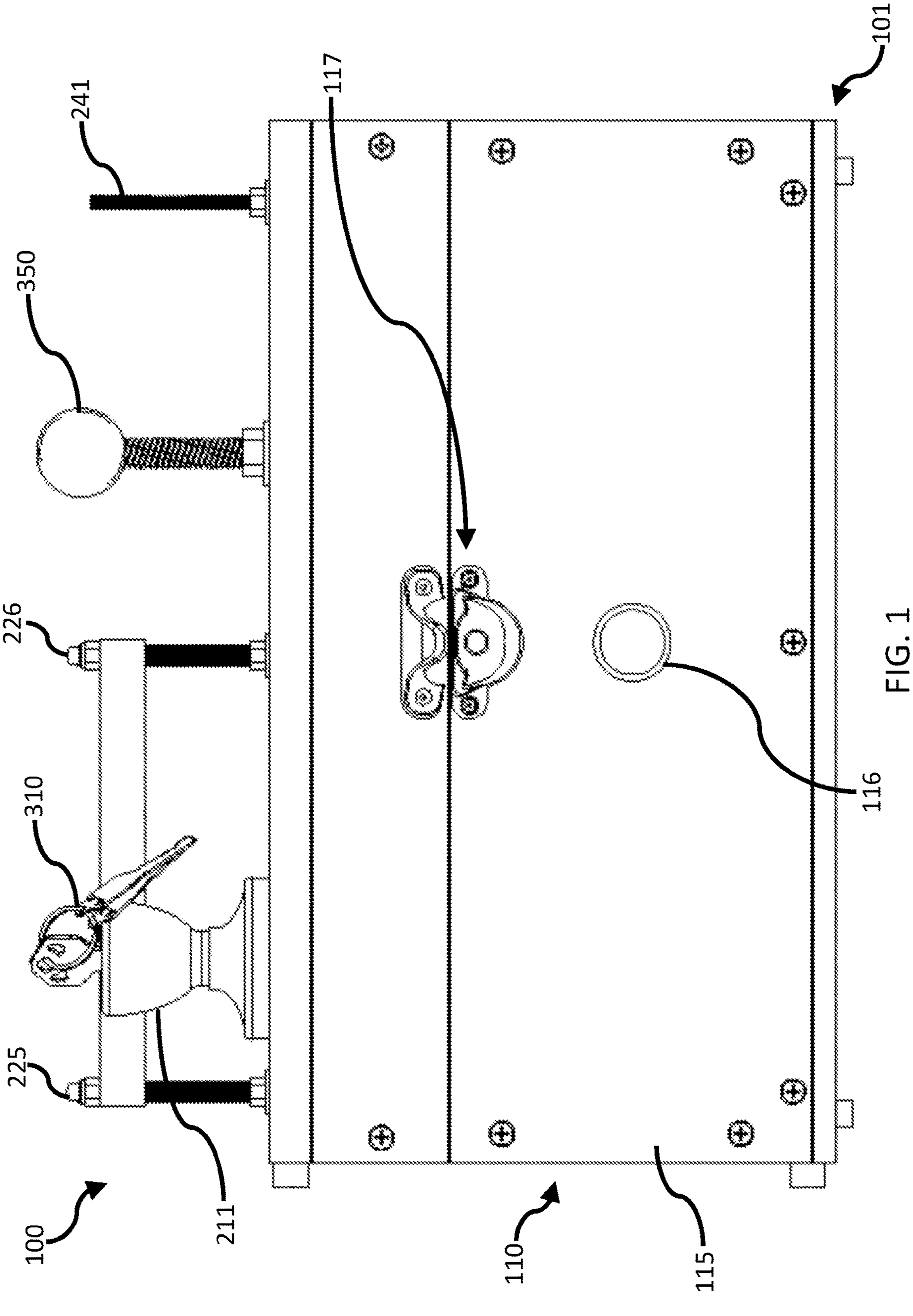
FIG. 1 illustrates a front view of an example of disclosed hand therapy systems.
Figure 2:
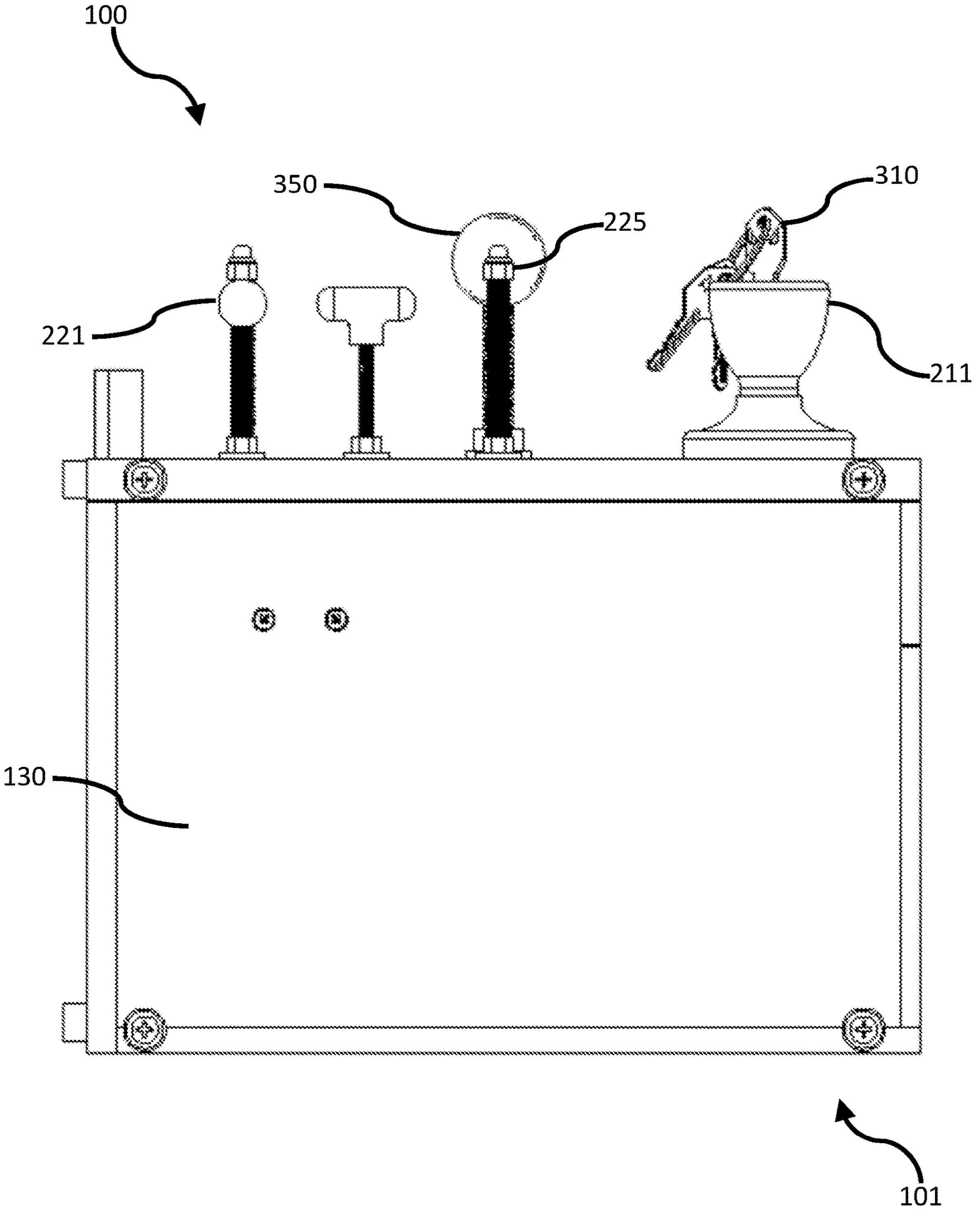
FIG. 2 illustrates a left-side view of the example hand therapy system of FIG. 1.
Figure 3:
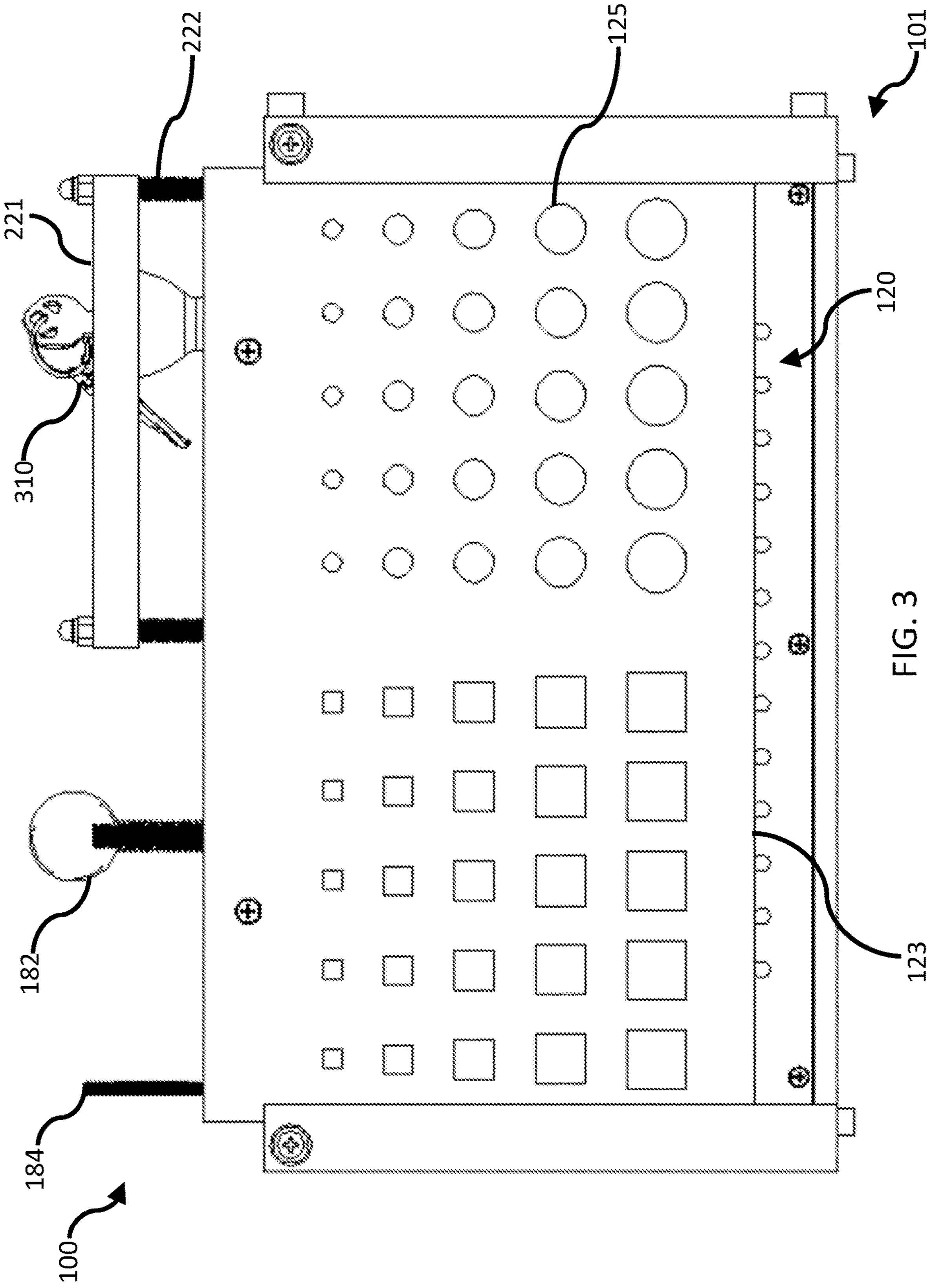
FIG. 3 illustrates a rear view of the example hand therapy system of FIGS. 1 & 2.
Figure 4:
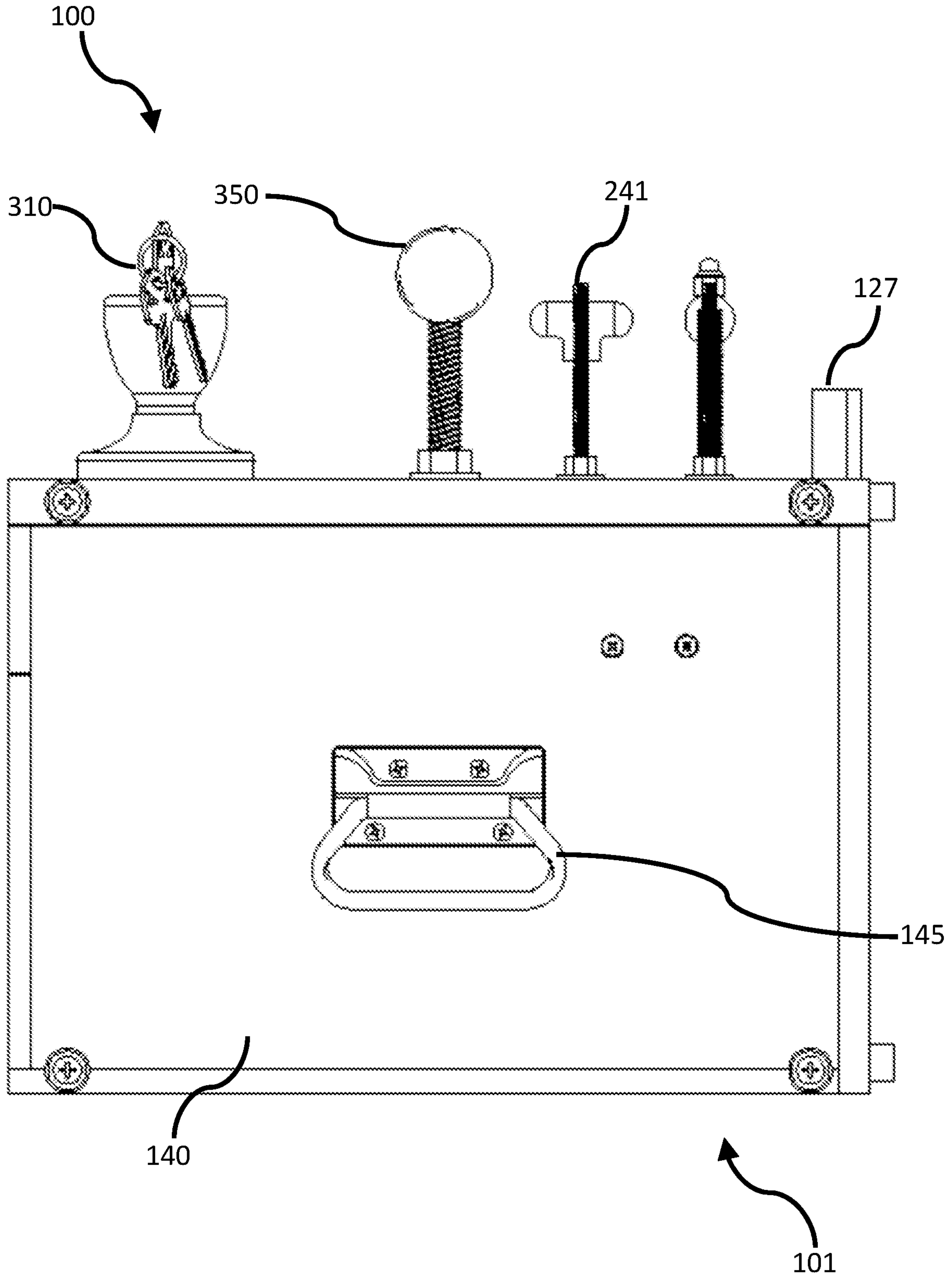
FIG. 4 illustrates a right-side view of the example hand therapy system of FIGS. 1-3.
Figure 5:
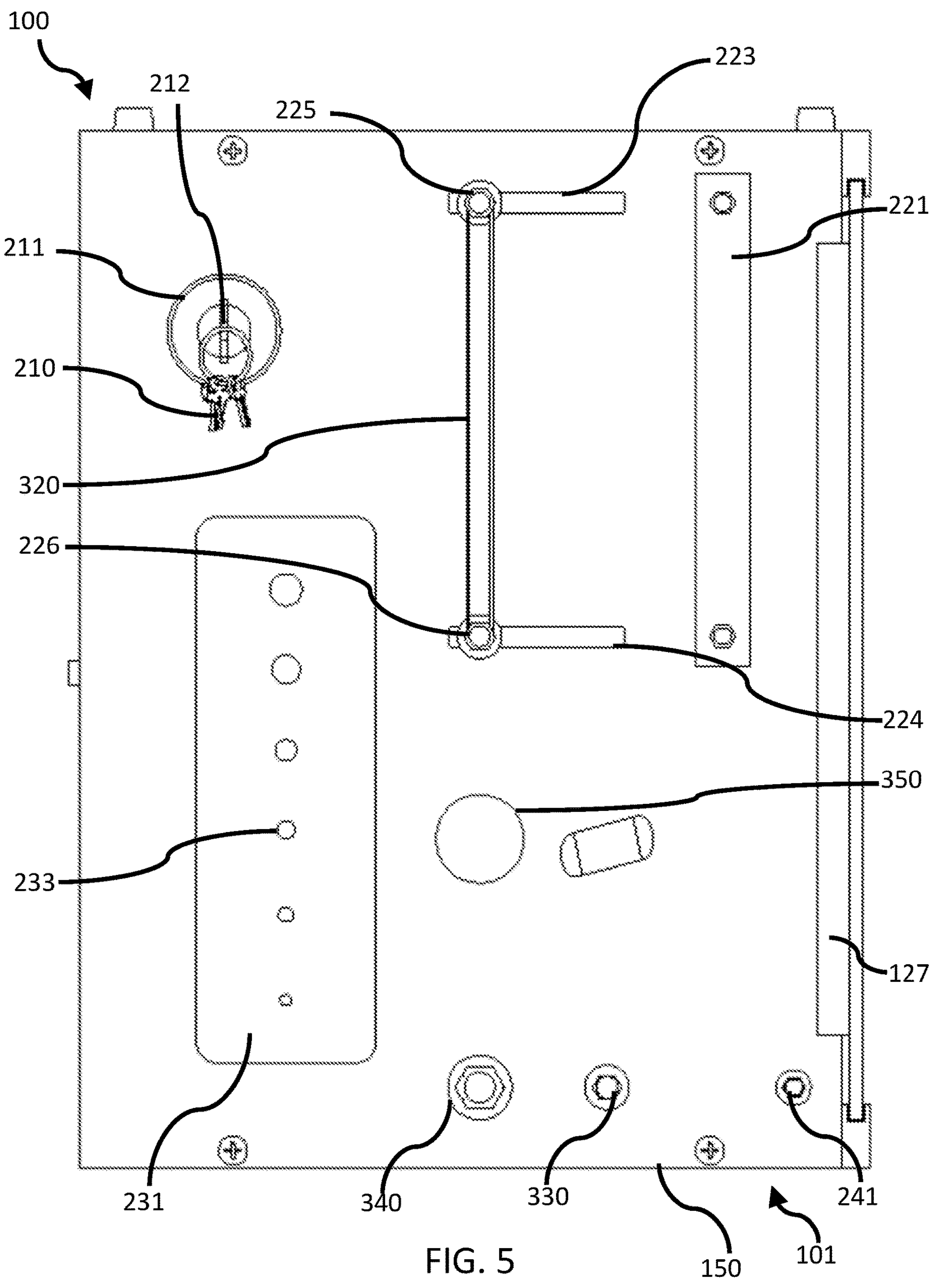
FIG. 5 illustrates a top view of the example hand therapy system of FIGS. 1-4.
Figure 6:
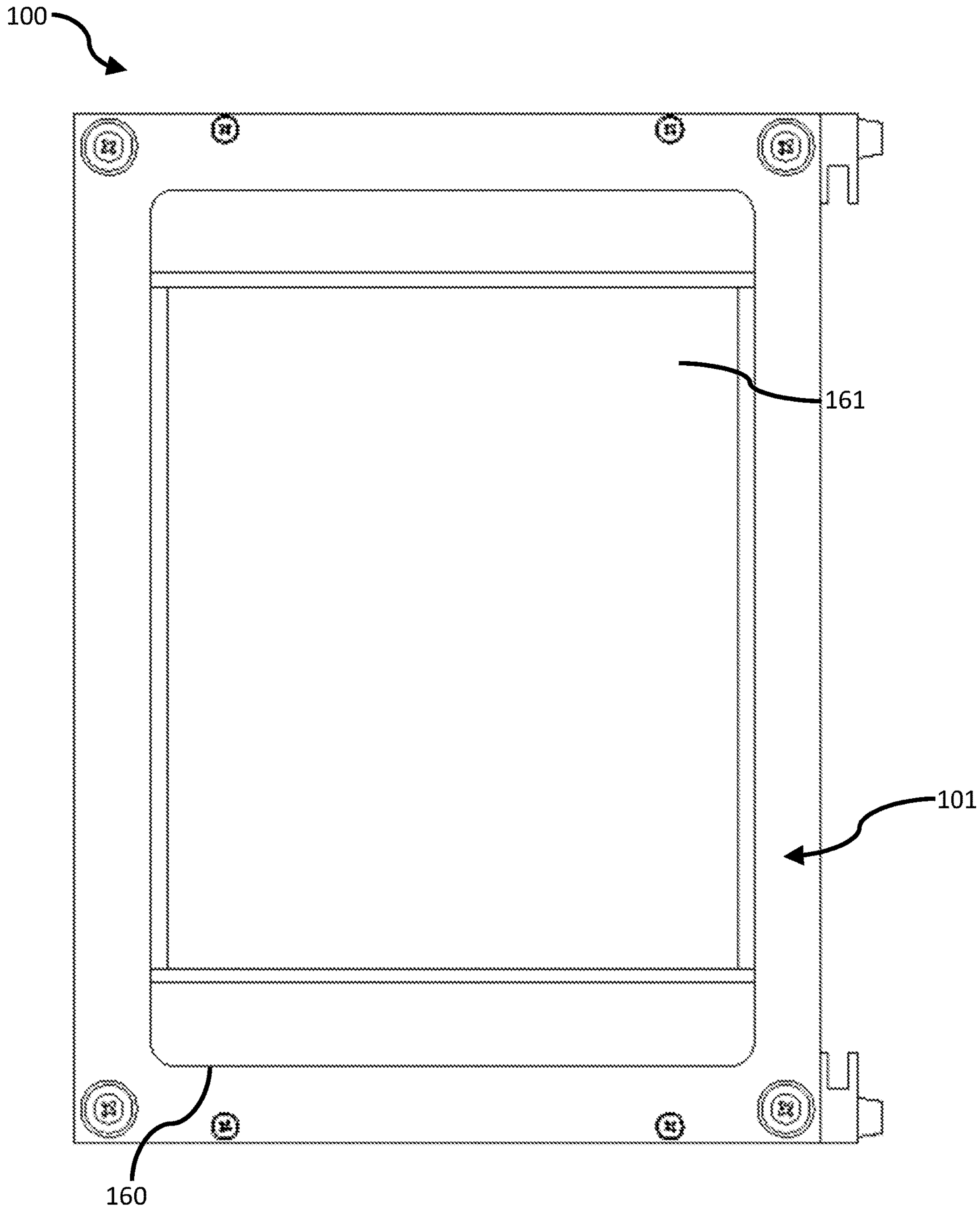
FIG. 6 illustrates a bottom view of the example hand therapy system of FIGS. 1-5.
Figure 7:
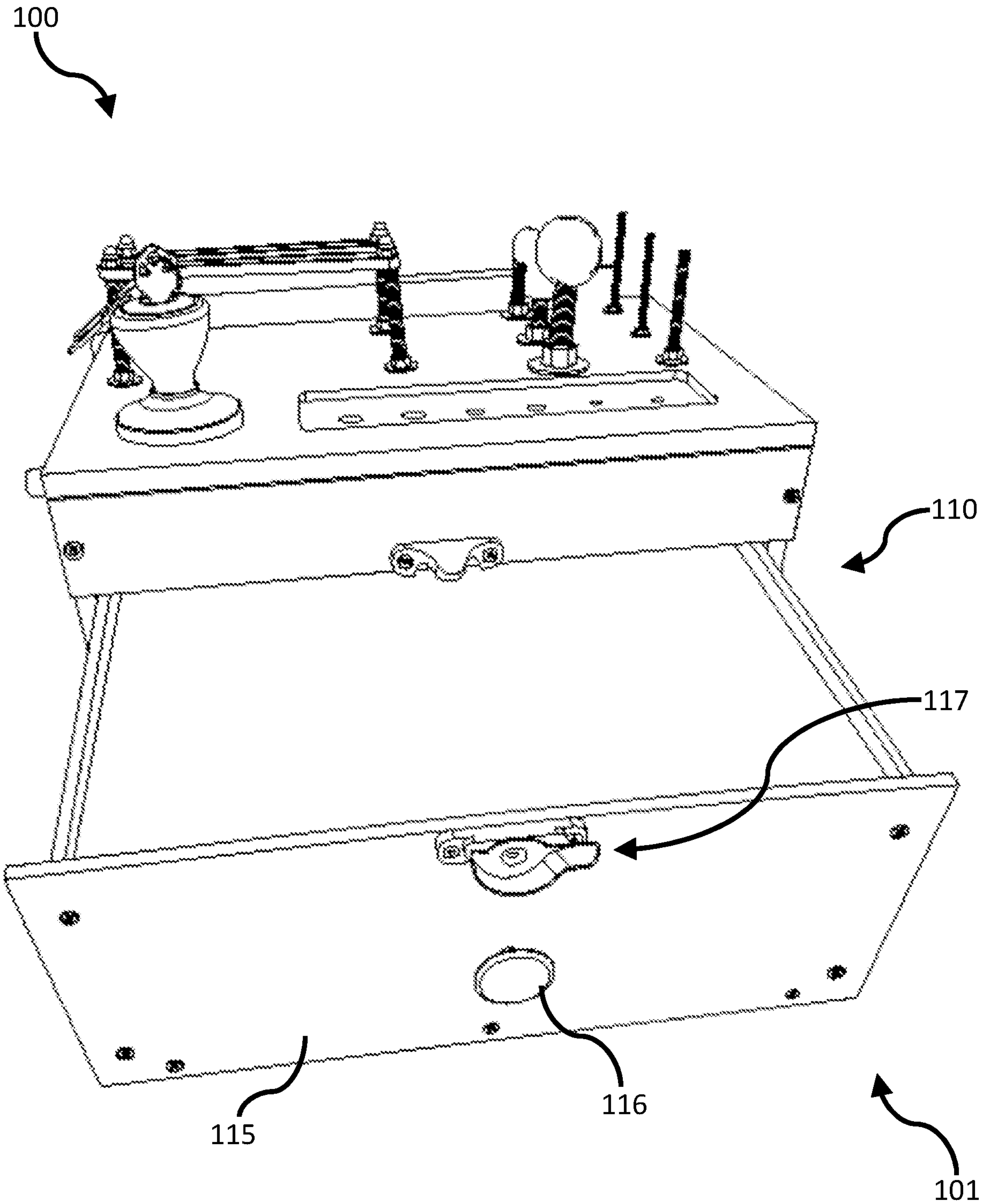
FIG. 7 illustrates a perspective view of the example hand therapy system with a drawer partially withdrawn of FIGS. 1-6.

FIGS. 1-9 illustrate an example hand therapy system 100. System 100 includes a substrate 101 having a number of exterior surfaces. Substrate 101 may take the form of a prism or box and may be provided as an enclosure. The exterior surfaces may include left side 130 (FIG. 2), right side 140 (FIG. 4), top 150 (FIG. 5) and bottom 160 surfaces (FIG. 6). Substrate 101 may further be provided with a front opening 110 (FIG. 7) and a rear opening 120 (FIG. 3). Bottom surface 160 may also include a bottom opening or may be excluded completely such that the entire bottom is open.

Substrate 101 is provided with several stations configured to support therapy for one or more facilities of a hand or hands of a user, subject or patient. The stations may be provided to one or more of the exterior surfaces of substrate 101 and include one or more of a station configured to exercise motor skills and motor planning for locking and/or unlocking doors, a station configured to exercise motor skills for opening and/or closing of a hand and/or extension and flexion of the fingers either together or individually, a station configured to exercise motor skills for fingertip thumb-finger oppositional gripping and rotating as well as size discernment, a station configured to exercise motor skills for palmar gripping and hand abduction and adduction, a station configured to exercise motor skills and motor planning for fingertip thumb-finger oppositional gripping and elbow extension and flexion as well as size discernment and a station configured to exercise motor skills and motor planning for fingertip thumb-finger oppositional gripping and elbow extension and flexion as well as size and shape discernment.

The station configured to exercise motor skills and motor planning for locking and/or unlocking doors (FIG. 5) may include a doorknob 211 with a keyhole 212 and one or more keys 310. Doorknob 211 may be provided to substrate 101 by mounting to/in one of several differently sized mounting holes (not visible) formed in one or more exterior surfaces of substrate 101.

The station configured to exercise motor skills for opening and/or closing of a hand (FIGS. 2, 3 & 5) may include an elongated handle 221 with a longitudinal axis spaced from an exterior surface by one or more supports 222. A pair of slots 223 and 224 each have a length extending away from the longitudinal axis of elongated handle 221. Supports 222 of elongated handle 221 may be mounted in a pair of mounting holes (not visible) formed in one or more exterior surfaces where each hole is aligned with one of slots 223 and 224. In an example, slots 223 and 224 are substantially parallel. In being substantially parallel, any deviation of slots 223 and 224 from parallel is not noticeable to an ordinary observer. For example, there may be a small angle of 1-3 degrees between the slots.

At least two posts 225 and 226 are configured for removable coupling to substrate 101 within slots 223 and 224 to suspend or otherwise support one or more elongate flexible members 320 configured for spanning posts 225 and 226 when mounted in slots 223 and 224. In an example, elongate flexible members 320 are elastic and may be formed from a type of rubber. In a further example, one or more of elongate flexible members 320 is a type of known rubber band formed as a loop. Posts 225 and 226 may be selectively slid along slots 223 and 224 closer to or further from elongated handle 221 and/or the mounting holes thereof. Posts 225 and 226 may be slid so as to be the same distance or different distances from elongate handle 221. A setting exhibiting different distances may find utility in enabling all fingers to engage with elongate flexible members 320 at the fingertips.

The station configured to exercise motor skills for fingertip thumb-finger oppositional gripping and elbow extension and flexion (FIG. 5) as well as size discernment includes a row 233 of differently sized openings which may be of a single shape or multiple shapes. The set of differently sized openings 233 may be row of graduated openings provided to a rectangular depression 231 formed in one of the exterior surfaces and configured to contain one or more rolling objects.

The station configured to exercise motor skills for fingertip thumb-finger oppositional gripping and rotating as well as size discernment (FIG. 5) includes a several differently sized, threaded shafts 241 configured for insertion through several mounting holes (not visible) formed in one or more of the exterior surfaces. A several differently sized nuts 330 are configured for threaded engagement with threaded shafts 241 and a several differently-sized washers 340 are configured for surrounding threaded shafts 241.

The station configured to exercise motor skills for palmar gripping and hand abduction and adduction (FIG. 5) includes several differently shaped knobs 350 and 252 configured for threaded engagement with one or more of threaded shafts 241. The set of differently shaped knobs 350 may include any of a variety of shapes such as cylindrical, spherical, pyramidal, a rectangular substrate or combinations of these.

In an example one or more of doorknob 211, row 233 of differently sized openings, elongated handle 221, slots 222 and 223 and threaded shafts 241 are provided to top surface 150. Threaded shafts 241, nuts 330, and/or knobs 350 may be threaded in either clockwise or counterclockwise directions.

Figure 8:
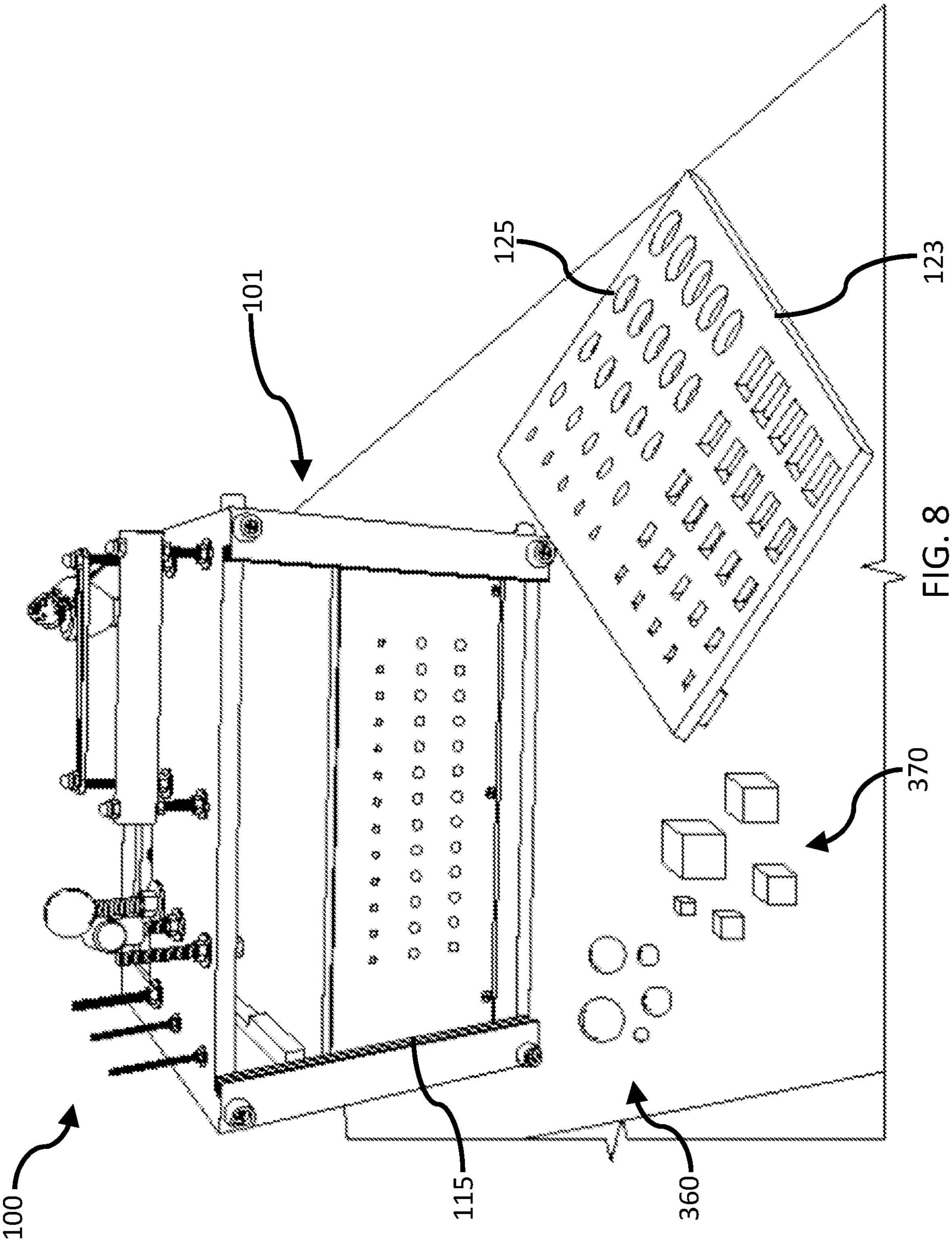
FIG. 8 illustrates a perspective view of the example hand therapy system with a plate removed and accessories removed from the drawer.

The station configured to exercise motor skills and motor planning for fingertip thumb-finger oppositional gripping and elbow extension and flexion as well as size and shape discernment (FIGS. 3 & 8) includes a plate 123 configured for removable, sliding engagement with substrate 101. Plate 123 includes a graduated matrix 125 of perforations of different shapes. In an example, plate 123 is configured to at least partially close rear opening 120 when fully inserted in substrate 101 (FIG. 3). Plate 123 may further include a prop 127 provided to a side thereof that the plate forms and angle with a support surface upon which it is resting when withdrawn from substrate 101 (FIG. 8). Prop 127 may further act as a stop or brake for limiting sliding action of plate 123 (FIG. 2).

Hand therapy system 100 may further include several differently sized balls 360 and differently-sized cubes 370 (FIG. 8) configured for receipt by correspondingly sized and/or shaped openings of the row 233 of openings or graduated matrix 125. Solids of other shapes including but not limited to cylinders and tetrahedrons may alternatively or additionally be provided so as to correspond with openings as part of the row 233 of openings and/or graduated matrix 125.

A drawer 115 (FIG. 7) may be provided for at least partial insertion into substrate 101 and includes a latch 117 to secure drawer 115 in an inserted position and a knob 116 to pull drawer 115 from the inserted position to an at least partially withdrawn position. In an example, drawer 115 is configured for at least partial insertion into front opening 110. Drawer 115 may provide storage for keys 310 or other objects associated with disclosed hand therapy systems including but not limited to elongated flexible members 320, threaded shafts 184, nuts 330, washers 340, knobs 350, spheres 360 and cubes 370.

A mirror 161 (FIG. 6) may be provided to substrate 101 at or near bottom surface 160. In an example, mirror 161 is provided to an underside of drawer 115 and is observable through a bottom opening.

Hand therapy system 100 is sufficiently small and lightweight such that it is portable by a patient, a therapist or other user without need for any type of lifting tool. For example, substrate 101 is 20" wide, 12" high/tall and 12" deep. In an example, substrate 101 is made from plastic panels fastened together or sheet metal wrapped around a lightweight frame. An example mass for system 100 is between about 5 and 10 kgs. A carrying handle 145 provided to one of left side 130 and right side 140. Substrate 101 may take any of a variety of shapes suitable for supporting a number of therapy stations or rehabilitation stations. In an example, substrate 101 has three mutually perpendicular surfaces.

Disclosed systems may be used in any of a variety of methods for exercising and/or rehabilitating a user's hand and/or fingers.

A first method exercises opening and/or closing of a hand and/or extension and flexion of the fingers. With a bottom surface of a substrate supported by an environmental surface, a user places a portion of a hand on an elongated handle elevated above a surface by one or more supports and having a longitudinal axis, places one or more fingers of the hand against one or more elastic members stretched between a pair of posts coupled with the top surface at a substantially transverse distance from the elongated handle and applies a force to the one or more elastic members with the one or more fingers. The force may be applied by extending the fingers. Alternatively or additionally, the force may be applied by flexing the fingers.

Another method exercises motor skills and motor planning for locking and/or unlocking doors. A user inserts a key into a keyhole provided to a doorknob coupled with a substrate and locks or unlocks a lock of the doorknob by rotating the key with supination and/or pronation.

Yet another method exercises fingertip thumb-finger oppositional gripping and elbow extension and flexion as well as size discernment. A user grasps one of several balls of different sizes and places the ball through a correspondingly sized opening of a row of differently sized openings provided to at least one surface of a substrate. Grasping of one of the balls may be performed by gripping the ball between the thumb and one of more of the opposing fingers. Moving the ball from a resting place to one of the openings may be performed by elbow flexion and subsequent extension in combination with internal and/or external rotation of the shoulder. Additionally or alternatively, one of the balls may be gripped between two adjacent fingers such as index and middle fingers.

Yet another method exercises fingertip thumb-finger oppositional gripping and rotating as well as size discernment. A user inserts one of several threaded shafts of different sizes through one of several holes through a top surface of a substrate and rotates a correspondingly sized one of several nuts of different sizes on the inserted, threaded shaft to advance the nut along the threaded shaft. In another example, one or more threaded shafts of the different sizes are already provided to the top surface of a substrate and the user places a correspondingly sized one of the nuts of different sizes on the threaded shaft and rotates the same to advance along the threaded shaft. The nut may be placed by gripping the nut between the thumb and one of more of the opposing fingers and moving the nut to the threaded shaft with elbow flexion and subsequent extension in combination with internal and/or external rotation of the shoulder. The user may rotate the nut by thumb-finger oppositional grip and release in coordination with wrist flexion and extension as well as supination and pronation. The nuts may be rotated in either clockwise or counterclockwise direction depending on the thread orientation of the threaded shafts and nuts.

Prior to rotating the nut on the inserted threaded shaft, the user may place one of several washers of different sizes on the inserted threaded shaft by gripping the washer between the thumb and one of more of the opposing fingers and moving the washer to the threaded shaft with elbow flexion and subsequent extension in combination with internal and/or external rotation of the shoulder.

Yet another method exercises palmar gripping and hand abduction and adduction. A user inserts one of several threaded shafts through one of several holes through a top surface of a substrate and threads one of several differently shaped knobs onto the inserted threaded shaft. For example, the user grips a knob in the palm, places the knob on a top end of one of the threaded shafts and subsequently abducts the hand, extends the fingers, adducts the hand and flexes the fingers repeatedly to rotate and advance the knob on the shaft. The user may rotate the knobs in either clockwise or counterclockwise directions depending on the threading orientation of the threaded shafts and knobs.

In another example, the threaded shafts are already provided to the top surface and the user places one of several differently shaped knobs onto the inserted threaded shaft and rotates.

In a further example, the user grips a cylindrical knob in the palm places the knob on a top end of one of the threaded shafts and subsequently abducts the hand, extends the fingers, adducts the hand and flexes the fingers repeatedly to advance the knob on the shaft. Alternatively or additionally, the user may grip a spherical knob in the palm places the knob on a top end of one of the threaded shafts and subsequently abducts the hand, extends the fingers, adducts the hand and flexes the fingers repeatedly to advance the knob on the shaft. The user may rotate the knobs in either clockwise or counterclockwise directions depending on the threading orientation of the threaded shafts and knobs 350.

Yet another method exercises fingertip thumb-finger oppositional gripping and elbow extension and flexion as well as size and shape discernment. A user slides a plate relative to a substrate to disengage the plate from the substrate, places the plate on a support surface with a prop of the plate contacting the surface such that the plate forms an angle with the support surface. The user then grasps one of several objects of different sizes and shapes and places the object through a correspondingly shaped perforation of a graduated matrix of perforations of different shapes provided through a surface of the substrate.

Grasping of one of the objects may be performed by gripping the object between the thumb and one of more of the opposing fingers by finger flexion. Additionally or alternatively, one or more of the objects may be gripped between two adjacent fingers such as index and middle fingers by finger adduction.

The actions described above are only illustrative and other alternatives can also be provided where one or more actions are added, one or more actions are removed, or one or more actions are provided in a different sequence without departing from the scope of the claims herein.

Embodiments of the disclosure are susceptible to being used for various purposes, including, though not limited to, enabling users to strengthen, rehabilitate and/or train hands, fingers, feet and/or toes in any setting.

Modifications to embodiments of the disclosure described in the foregoing are possible without departing from the scope of the disclosure as defined by the accompanying claims. Expressions such as "including", "comprising", "incorporating", "consisting of", "have", "is" used to describe and claim disclosed features are intended to be construed in a non-exclusive manner, namely allowing for items, components or elements not explicitly described also to be present. Reference to the singular is also to be construed to relate to the plural.

What is claimed is:

1. A hand therapy system, comprising:

a substrate having a front opening, a rear opening, and left side, right side, top, and bottom surfaces;

provided to one of the surfaces:

- a rectangular depression with at least one row of differently-sized openings provided thereto;
- a pair of slots;
- a first hole aligned with a first slot of the pair of slots and a second hole aligned with the first hole and a second slot of the pair of slots;
- a plurality of differently-sized mounting holes; and a doorknob with a keyhole configured for mounting in one of the plurality of differently-sized mounting holes.

2. The hand therapy system as set forth in claim 1, further comprising, configured for mounting in the pair of slots, at least two posts.

3. The hand therapy system as set forth in claim 2, further comprising, configured for spanning the at least two posts when mounted in the pair of slots, an elongate flexible member.

4. The hand therapy system as set forth in claim 1, further comprising, configured for mounting in the first and second holes, an elongated handle.

5. The hand therapy system as set forth in claim 1, further comprising, configured for at least partial insertion into and withdrawal from the front opening, a drawer.

6. The hand therapy system as set forth in claim 1, further comprising, configured for removable, sliding engagement with the substrate to at least partially close the rear opening, a plate including a graduated matrix of perforations of different shapes.

7. The hand therapy system as set forth in claim 1, further comprising a plurality of differently-sized balls configured for receipt by correspondingly sized openings of the at least one row of differently-sized openings.

8. The hand therapy system as set forth in claim 1, wherein the substrate is portable.

9. The hand therapy system as set forth in claim 1, further comprising, configured for receipt within the plurality of differently-sized mounting holes, a plurality of differently-sized threaded shafts.

10. The hand therapy system as set forth in claim 9, further comprising, configured for threaded engagement with the plurality of differently-sized threaded shafts, a plurality of differently-sized nuts.

11. The hand therapy system as set forth in claim 9, further comprising, configured for receipt by the plurality of differently-sized threaded shafts, a plurality of differently-sized washers.

12. The hand therapy system as set forth in claim 9, further comprising, configured for mounting to the plurality of differently-sized threaded shafts, a plurality of differently-shaped knobs.

13. A hand therapy system, comprising:

an enclosure having a front opening, a rear opening, and left side, right side, top, and bottom surfaces;

provided to one of the surfaces:

a doorknob with a keyhole;

a rectangular depression with a row of graduated openings;

an elongated handle with a longitudinal axis elevated above the top surface by one or more supports; and a pair of slots extending away from the elongated handle.

14. The hand therapy system as set forth in claim 13, further comprising, provided to the surfaces, a plurality of differently shaped knobs.

15. The hand therapy system as set forth in claim 13, further comprising, configured for removable, sliding engagement with the enclosure to at least partially close the rear opening, a plate including a graduated matrix of perforations of different shapes.

16. The hand therapy system as set forth in claim 13, further comprising a plurality of differently-sized balls configured for receipt by correspondingly sized openings of the row of graduated openings.

17. The hand therapy system as set forth in claim 13, further comprising:

configured for mounting in the pair of slots, at least two posts; and configured for spanning the at least two posts when mounted in the pair of slots, an elongate flexible member.

* * * * *